United States Patent
Lai

(10) Patent No.: US 7,443,456 B2
(45) Date of Patent: Oct. 28, 2008

(54) DUAL MODE LIQUID CRYSTAL DISPLAY DEVICE WITH CAPACITOR ELECTRODES SEPARATE FROM PIXEL ELECTRODE PERFORMING AND FUNCTIONING AS A REFLECTION ELECTRODE

(75) Inventor: Chien-Ting Lai, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 367 days.

(21) Appl. No.: 11/273,384

(22) Filed: Nov. 14, 2005

(65) Prior Publication Data

US 2006/0103771 A1    May 18, 2006

(30) Foreign Application Priority Data

Nov. 12, 2004    (TW) .............................. 93134592 A

(51) Int. Cl.
*G02F 1/1343* (2006.01)
(52) U.S. Cl. .......................................... 349/38; 349/114
(58) Field of Classification Search ............... 349/38, 349/39, 114
See application file for complete search history.

(56) References Cited

U.S. PATENT DOCUMENTS

| 6,195,140 | B1 * | 2/2001 | Kubo et al. .................... 349/44 |
| 6,654,087 | B2 | 11/2003 | Song et al. |
| 6,972,432 | B1 * | 12/2005 | Furuya .......................... 257/59 |
| 7,092,062 | B2 * | 8/2006 | Ozawa ......................... 349/152 |
| 7,161,647 | B2 * | 1/2007 | Iijima .......................... 349/113 |
| 7,289,187 | B2 * | 10/2007 | Choo ........................... 349/187 |

FOREIGN PATENT DOCUMENTS

CN         1402065        3/2003

* cited by examiner

*Primary Examiner*—David C. Nelms
*Assistant Examiner*—John Heyman
(74) *Attorney, Agent, or Firm*—Wei Te Chung

(57) ABSTRACT

An LCD device (100) includes a first substrate (110), a second substrate (120), and a liquid crystal layer (130) having liquid crystal molecules interposed between the first and second substrates. A pixel electrode (112) is disposed at an inner surface of the first substrate, and a common electrode (122) is disposed at an inner surface of the second substrate. A storage capacitor (140) has an upper storage electrode (118) and a lower storage electrode (113) disposed at an inner surface of the first substrate, with the upper storage electrode electrically connecting with the pixel electrode. The upper storage electrode functions as a reflection electrode. This structure ensures the LCD device is capable of providing a display both in a reflection mode and a transmission mode.

14 Claims, 3 Drawing Sheets

DUAL MODE LIQUID CRYSTAL DISPLAY DEVICE WITH CAPACITOR ELECTRODES SEPARATE FROM PIXEL ELECTRODE PERFORMING AND FUNCTIONING AS A REFLECTION ELECTRODE

FIELD OF THE INVENTION

The present invention relates to liquid crystal display (LCD) devices, and more particularly to a reflection/transmission type LCD device capable of providing a display both in a reflection mode and a transmission mode.

BACKGROUND

Conventionally, Cathode Ray Tubes (CRTs), Electroluminescence (EL) displays, Plasma Display Panels (PDPs) etc. have been put into practical use as light emissive type displays, in which the content of the display can be overwritten electrically.

However, these types of light emitting displays generally have high power consumption. Further, the light-emitting surfaces of these types of displays are highly reflective. Therefore if the display is used under circumstances where the ambient light is brighter than the luminance (for example, in direct sunlight), then a phenomenon known as "wash-out" invariably occurs, and the display cannot be easily observed.

On the other hand, LCD devices have been put into practical use as non-light emissive type displays. That is, LCD devices display characters and/or images by using a background light source rather than by emitting a display light. These LCD devices include a transmission type LCD device and a reflection type LCD device.

Of the two types of LCD devices, the transmission type is more popular. The transmission type LCD device employs a light source called a "backlight" behind the liquid crystal cell. Since transmission type LCD devices are advantageous due to their thinness and light weight, they have been used in numerous, diverse fields. However, transmission type LCD devices consume a large amount of power to keep the backlight on. Thus, even though only a small amount of power is consumed to adjust transmittance of liquid crystals of the LCD device, a relatively large amount of power is consumed overall.

Transmission type LCD devices wash out less frequently compared with light emissive displays. In particular, in the case of color transmission type LCD devices, the reflectance on the display surface of a color filter layer is reduced by reflectance reducing means such as a black matrix.

It becomes difficult to readily observe the display on color transmission type LCD devices when they are used under circumstances where the ambient light is very strong and the display light is relatively weak. This problem can be mitigated or eliminated by using a brighter backlight, but this solution further increases power consumption.

Unlike light emissive displays and transmission type LCD devices, reflection type LCD devices show the display by using ambient light. Thereby a brightness of the display is proportional to the amount of ambient light. Thus, reflection type liquid crystal displays are advantageous insofar as they do not wash out. When used in a very bright place in direct sunlight, for example, the display can be observed all the more sharply. Further, the reflection type liquid crystal display does not use a backlight, and therefore has the further advantage of low power consumption. For the above reasons, reflection type LCD devices are particularly suitable for outdoor use, such as in portable information terminals, digital cameras, and portable video cameras.

However, since reflection type LCD devices use ambient light for the display, the display luminance largely depends on the surrounding environment. When the ambient light is weak, the display cannot be easily observed. In particular, in the case where a color filter is used for realizing the color display, the color filter absorbs much light and the display is darker. Thus, when the LCD device is used under these circumstances, the ambient light problem is even more pronounced.

Therefore, what is needed is a transflective LCD which can overcome the above-described problems.

SUMMARY

A reflection/transmission type LCD device includes a first substrate and a second substrate, and a liquid crystal layer having liquid crystal molecules interposed between the first and second substrates. A pixel electrode is disposed at an inner surface of the first substrate, and a common electrode is disposed at an inner surface of the second substrate.

In one embodiment of the LCD device, a storage capacitor has an upper storage electrode and a lower storage electrode disposed at an inner surface of the first substrate, with the upper storage electrode electrically connecting with the pixel electrode. The upper storage electrode functions as a reflection electrode.

In another embodiment of the LCD device, a lower storage electrode is disposed at an inner surface of the first substrate and cooperates with the pixel electrode to form capacitors. The lower storage electrode functions as a reflection electrode.

In still another embodiment of the LCD device, a storage capacitor has an upper storage electrode and a lower storage electrode disposed at an inner surface of the first substrate, with the upper storage electrode electrically connecting with the pixel electrode. The lower storage electrode functions as a reflection electrode.

With these configurations, the LCD device can effectively use light emitted from a backlight and passing through the pixel electrode when the ambient light is low, and light reflected by the upper storage electrode or the lower storage electrode when the ambient light is high. Further, both the pixel electrode and the upper/lower storage electrode can be used to generate a display, therefore the LCD device capable of providing a display both in a transmission mode and a reflection mode is obtained. Moreover, the LCD device can provide a bright display under various ambient light conditions.

Other advantages and novel features will become more apparent from the following detailed description when taken in conjunction with the accompanying drawings.

DETAILED DESCRIPTION OF PREFERRED EMBODIMENTS

Figure 1:
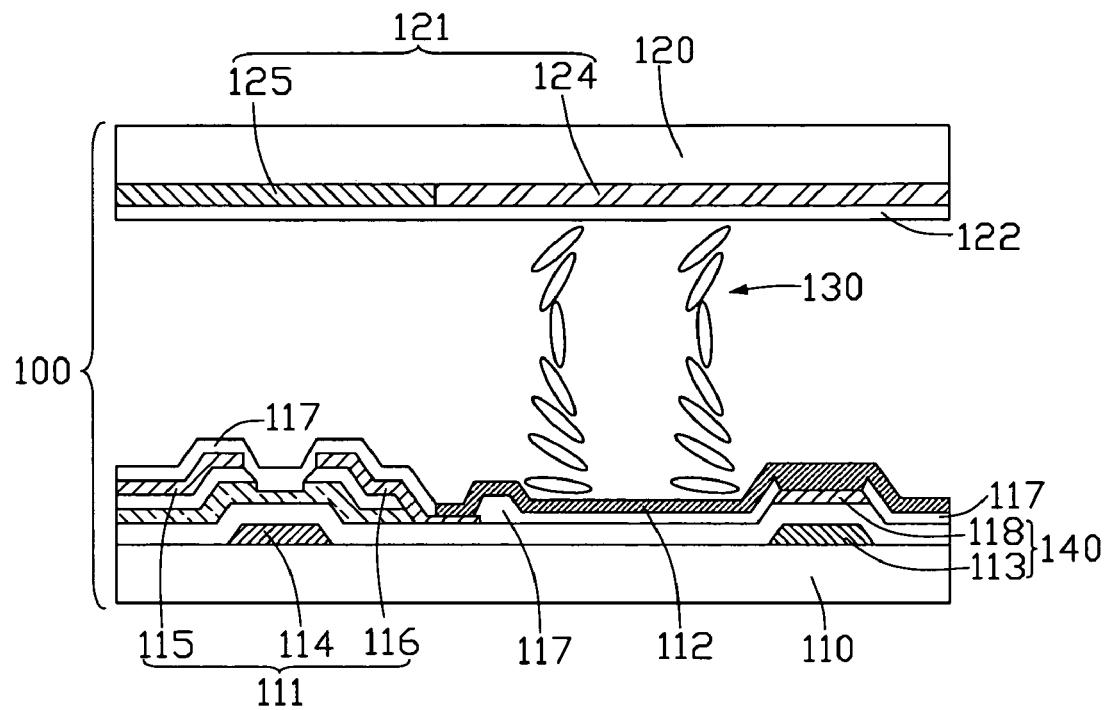
FIG. 1 is a schematic, side cross-sectional view of part of an LCD device according to a first embodiment of the present invention.

FIG. 1 is a schematic, side cross-sectional view of part of an LCD device according to a first embodiment of the present invention. The LCD device 100 includes a lower substrate 110, an upper substrate 120 disposed parallel to and spaced apart from the lower substrate 110, and a liquid crystal layer 130 having liquid crystal molecules (not labeled) sandwiched between the substrates 110 and 120.

A thin film transistor (TFT) 111, a pixel electrode 112, and a storage capacitor 140 are disposed on an inner surface of the lower substrate 110. The TFT 111 includes a gate electrode 114, a source electrode 115, and a drain electrode 116, with the drain electrode 116 being electrically connected to the pixel electrode 112. The storage capacitor 140 includes a lower storage electrode 113 and an upper storage electrode 118, with the upper storage electrode 118 being electrically connected to the pixel electrode 112. The lower and upper storage electrodes 113, 118 cooperate with an insulating film 117 to form capacitors. A material of the upper storage electrode 118 is a highly reflective conductive material such as Al, Ag, AlNd or AlY, thus the upper storage electrode 118 functions as a reflection electrode. A material of the pixel electrode 112 is a transparent material, such as Indium Tin Oxide (ITO) or Indium Zinc Oxide (IZO).

A color filter 121 and a common electrode 122 are disposed on an inner surface of the upper substrate 120 in that order. The color filter 121 includes a color region 124 and a black mask 125. The black mask 125 is positioned corresponding to the TFT 111, in order to prevent ambient light from irradiating the TFT 111.

The pixel electrode 112, the common electrode 122, and the liquid crystal layer 130 between the pixel electrode 112 and the common electrode 122 cooperatively define a pixel region of the LCD device 100. The pixel region includes a transmission electrode area and a reflection electrode area. Part of the pixel electrode through which light emitted by a backlight (not shown) can pass is referred to as a transmission electrode, and the upper storage electrode 118 of the storage capacitor 140 is referred to as a reflection electrode. The area of the pixel region corresponding to the transmission electrode is referred to as the transmission electrode area, and the area of the pixel region corresponding to reflection electrode is referred to as the reflection electrode area.

With the above construction, the LCD device 100 is able to effectively use light emitted from the backlight and passing through the transmission electrode regions when the ambient light is low, and also is able to use light reflected by the reflection electrode regions when the ambient light is high. Further, both the transmission electrode areas and the reflection electrode areas can be used to generate a display, therefore the LCD device 100 capable of providing a display both in a reflection mode and a transmission mode is obtained. Moreover, the LCD device 100 can provide a bright display under various ambient light conditions.

Figure 2:
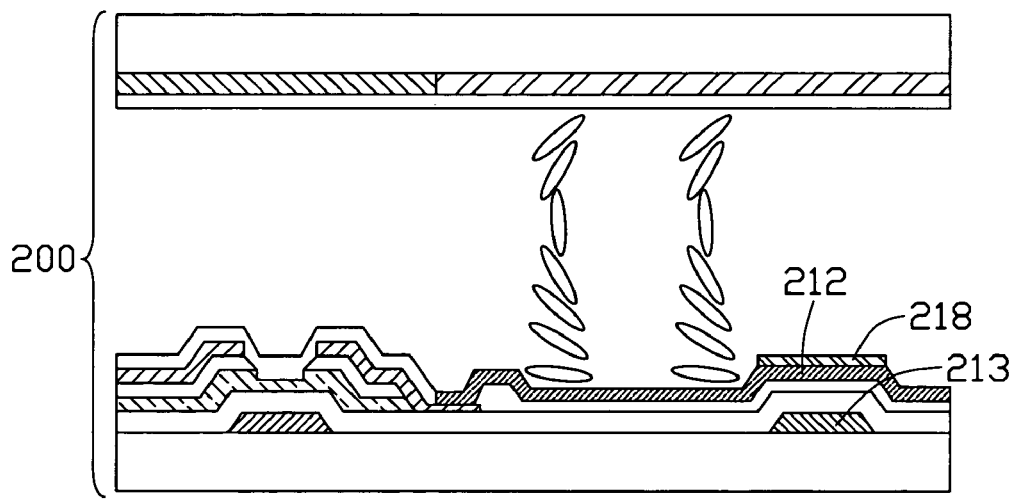
FIG. 2 is a schematic, side cross-sectional view of part of an LCD device according to a second embodiment of the present invention.

FIG. 2 is a schematic, side cross-sectional view of part of an LCD device according to a second embodiment of the present invention. The LCD device 200 has a structure similar to that of the LCD device 100. However, in the LCD device 200, part of the pixel electrode 212 is referred to as the upper storage electrode of the storage capacitor, the upper storage electrode forming capacitors with the lower storage electrode 213. In addition, a reflector 218 disposed on the pixel electrode 212 corresponds to the lower storage electrode 213. A material of the reflector 218 is a highly reflective material such as Al, Ag, AlNd, AlY, or resin; therefore the upper storage electrode and the reflector 218 are together referred to as a reflection electrode. In the second embodiment, the pixel region corresponding to reflector 218 is referred to as the reflection electrode area. The reflection electrode area performs a reflection display function.

Figure 3:
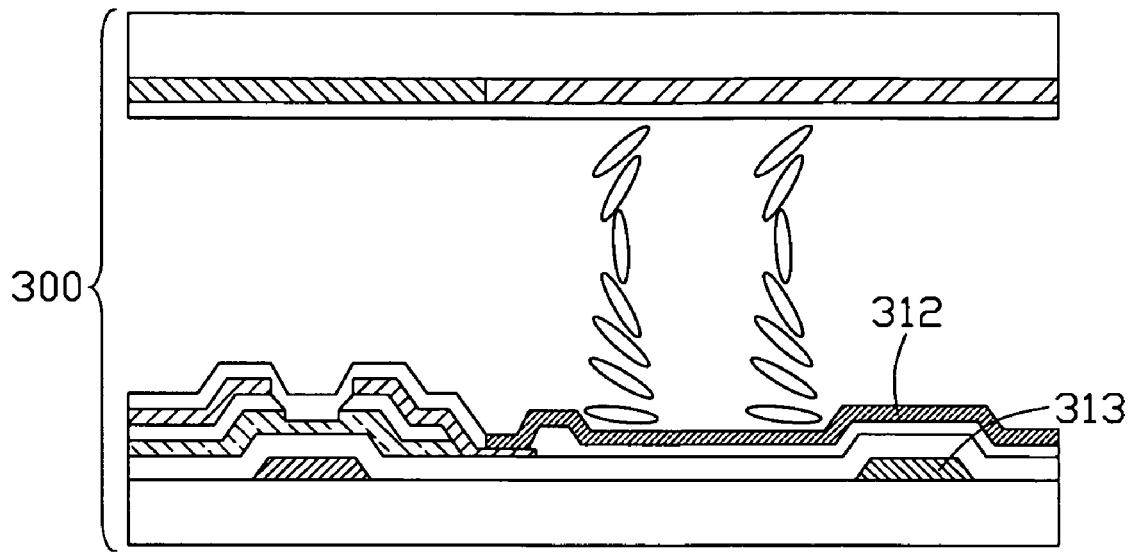
FIG. 3 is a schematic, side cross-sectional view of part of an LCD device according to a third embodiment of the present invention.

FIG. 3 is a schematic, side cross-sectional view of part of an LCD device according to a third embodiment of the present invention. The LCD device 300 has a structure similar to that of the LCD device 100. However, in the LCD device 300, part of the pixel electrode 312 is referred to as the upper storage electrode of the storage capacitor, the upper storage electrode forming capacitors with the lower storage electrode 313. In addition, a material of the lower storage electrode 313 is a highly reflective conductive material such as Al, Ag, AlNd, or AlY; therefore the lower storage electrode 313 performs as a reflection electrode. In the third embodiment, the pixel region corresponding to the lower storage electrode 313 is referred to as the reflection electrode area. The reflection electrode area performs a reflection display function.

Figure 4:
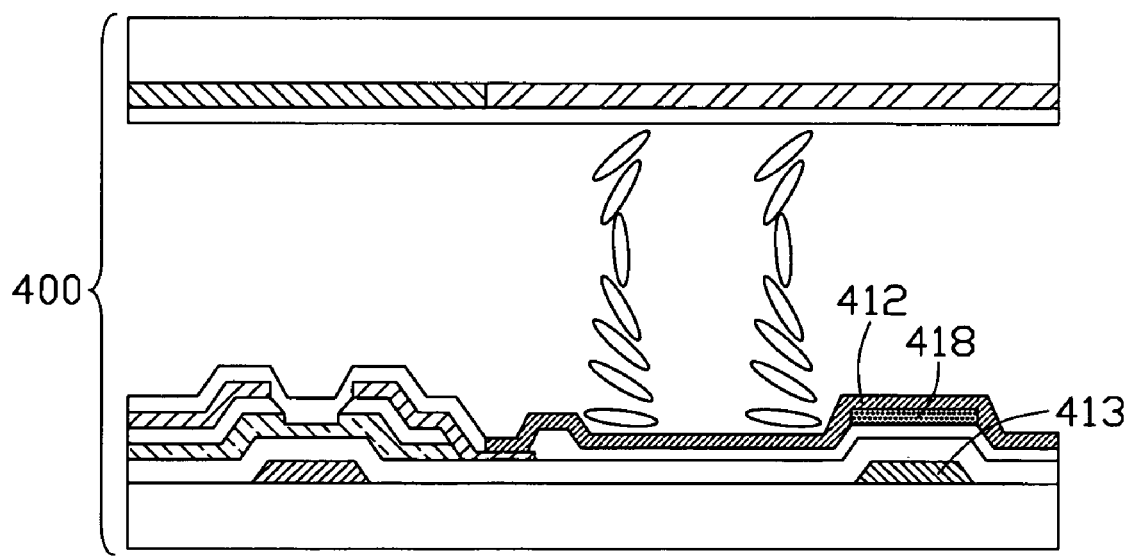
FIG. 4 is a schematic, side cross-sectional view of part of an LCD device according to a fourth embodiment of the present invention.

FIG. 4 is a schematic, side cross-sectional view of part of an LCD device according to a fourth embodiment of the present invention. The LCD device 400 has a structure similar to that of the LCD device 100. However, in the LCD device 400, the upper storage electrode 418 that connects with the pixel electrode 412 is a transparent electrode. In addition, a material of the lower storage electrode 413 is a high reflectivity conductive material such as Al, Ag, AlNd, or AlY; therefore the lower storage electrode 413 is a reflection electrode.

Figure 5:
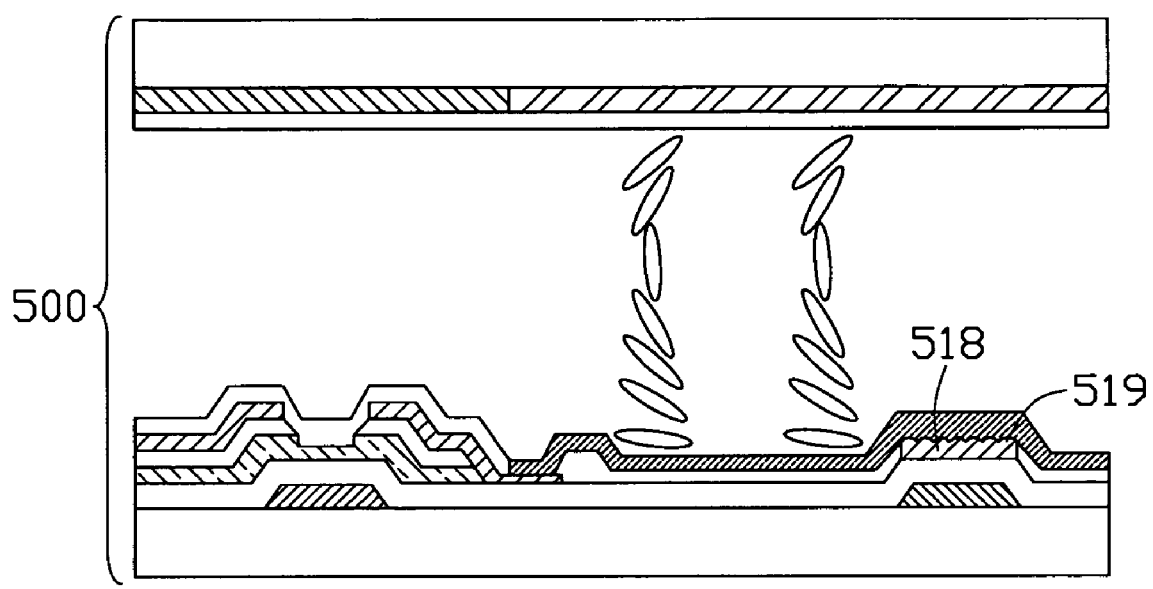
FIG. 5 is a schematic, side cross-sectional view of part of an LCD device according to a fifth embodiment of the present invention.

FIG. 5 is a schematic, side cross-sectional view of part of an LCD device according to a fifth embodiment of the present invention. The LCD device 500 has a structure similar to that of the LCD device 100. However, in the LCD device 500, the upper storage electrode 518 has an uneven surface, thereby defining a plurality of bumps 519. A material of the upper storage electrode 518 is a high reflectivity conductive material such as Al, Ag, AlNd, or AlY; therefore the upper storage electrode 518 functions as a reflection electrode. The bumps 519 may scatter light beams in order to avoid the so-called mirror reflection effect.

In alternative embodiments, as regards the LCD device 200, the pixel electrode 212 covered by the reflector 218 can have a plurality of bumps. As regards the LCD device 300, the lower storage electrode 313 can have a plurality of bumps. As regards any of the LCD devices 100, 200, 300, 400, 500, a diffuser may be disposed on a surface of the upper substrate 120.

With any of the above constructions, the LCD device can effectively use light emitted from the backlight and passing through the transmission electrode areas when the ambient light is low, and light reflected by the reflection electrode areas when the ambient light is high. Further, both the transmission electrode areas and the reflection electrode areas can be used to generate a display, therefore the LCD device capable of providing a display both in a reflection mode and a transmission mode is obtained. Moreover, the LCD device can provide a bright display under various ambient light conditions.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a first substrate and a second substrate;
   a liquid crystal layer having liquid crystal molecules interposed between the first and second substrates;
   a pixel electrode disposed at an inner surface of the first substrate;
   a common electrode disposed at an inner surface of the second substrate; and
   a storage capacitor having an upper storage capacitor electrode and a lower storage capacitor electrode disposed at the inner surface of the first substrate, the upper storage capacitor electrode separate from and electrically connecting with the pixel electrode;
   wherein the upper storage capacitor electrode performs and functions as a reflection electrode.

2. The liquid crystal display device as claimed in claim 1, wherein the upper storage capacitor electrode is made of a material selected from the group consisting of Al, Ag, AlNd, and AlY.

3. The liquid crystal display device as claimed in claim 1, wherein the upper storage capacitor electrode comprises a transparent electrode and a reflector, and the reflector covers the transparent electrode.

4. The liquid crystal display device as claimed in claim 3, wherein the reflector is made of a material selected from the group consisting of Al, Ag, AlNd, AlY, and resin.

5. The liquid crystal display device as claimed in claim 1, wherein a surface of the upper storage capacitor electrode has a plurality of bumps.

6. The liquid crystal display device as claimed in claim 1, further comprising a diffuser disposed on a surface of the second substrate.

7. A liquid crystal display device, comprising:
   a first substrate and a second substrate;
   a liquid crystal layer having liquid crystal molecules interposed between the first and second substrates;
   a pixel electrode disposed at an inner surface of the first substrate;
   a common electrode disposed at an inner surface of the second substrate; and
   a lower storage capacitor electrode disposed at the inner surface of the first substrate and cooperating with the pixel electrode to form storage capacitors;
   wherein the lower storage capacitor electrode performs and functions as a reflection electrode.

8. The liquid crystal display device as claimed in claim 7, wherein the lower storage capacitor electrode is made of a material selected from the group consisting of Al, Ag, AlNd, and AlY.

9. The liquid crystal display device as claimed in claim 8, wherein a surface of the lower storage capacitor electrode has a plurality of bumps.

10. The liquid crystal display device as claimed in claim 7, further comprising a diffuser disposed on a surface of the second substrates.

11. A liquid crystal display device, comprising:
    a first substrate and a second substrate;
    a liquid crystal layer having liquid crystal molecules interposed between the first and second substrates;
    a pixel electrode disposed at an inner surface of the first substrate;
    a common electrode disposed at an inner surface of the second substrate; and
    a storage capacitor disposed at the inner surface of the first substrate, the storage capacitor including an upper storage capacitor electrode and a lower storage capacitor electrode, the upper storage capacitor electrode being electrically connected with the pixel electrode;
    wherein the upper storage capacitor electrode is a transparent electrode, and the lower storage capacitor electrode performs and functions as a reflection electrode.

12. The liquid crystal display device as claimed in claim 11, wherein the lower storage capacitor electrode is made of a material selected from the group consisting of Al, Ag, AlNd, and AlY.

13. The liquid crystal display device as claimed in claim 12, wherein a surface of the lower storage capacitor electrode has a plurality of bumps.

14. The liquid crystal display device as claimed in claim 11, further comprising a diffuser disposed on a surface of the second substrate.

* * * * *